Patented Nov. 3, 1942

2,300,495

UNITED STATES PATENT OFFICE 2,300,495

MOUNTING OF SPECIMENS AND THE LIKE

Howard L. Gerhart, Milwaukee, Wis., assignor to Pittsburgh Plate Glass Company, Allegheny County, Pa., a corporation of Pennsylvania No Drawing. Application June 13, 1939, Serial No. 278,923

2 Claims. (Cl. 35—20)

The present invention relates to methods of mounting specimens, such as entomological, botanical, zoological, mineralogical specimens, delicate objects of art and the like by embedment in a transparent plastic medium.

One object of the invention is to provide a simple and convenient process of mounting scientific specimens and the like objects, which is simple in character, admits of viewing the specimens from any desired angle, admits of prolonged handling and examination of the specimens without damaging or deranging them, and which does not unduly affect the coloration of the objects.

The conventional method of preserving entomological, zoological, botanical and such like specimens involves immersion in a preservative fluid such as alcohol or a solution of formaldehyde. Such process is objectionable for many reasons. For example, because of the fluidity of the medium the specimens cannot be inverted for purposes of viewing them from various angles without danger of deranging or damaging them. Moreover, the preservative medium usually damages or destroys the coloration of the body almost immediately. Obviously the objects and the medium in which they are preserved must be retained in a fluid-tight container, such as a bottle or the like, which usually is not particularly attractive in appearance and which is subject to risk of breakage during handling or storage.

In accordance with the provisions of the present invention specimens of the foregoing types, as well as various objects of art, are embedded in an inert but clear and solid artificial resin. In the process specimens are introduced into a solution of the resin, which is then appropriately polymerized by the application of ultraviolet light and/or by the action of a catalytic substance to obtain permanent solidification. Resins suitable for the purpose are disclosed in my copending application filed November 23, 1938, Ser. No. 242,127.

In the preparation of the resin, maleic anhydride, together with a solvent and with or without a polymerization catalyst is admixed with styrene, and then, after incorporation of the sample to be preserved, is subjected to irradiation either continuously or intermittently to obtain condensation into a solid body. In the practice of the invention maleic anhydride in the ratio of 10 grams is incorporated with a solvent such as a mixture of equal parts of mesityl oxide and triacetin or xylol or methyl ethyl ketone, in the ratio of 6 cc. To this is added a small amount, e. g. a granule of the size of a grain of rice of a catalyst, such as benzoyl peroxide. These materials are heated together until solution takes place, after which they are cooled to 30 or 40 degrees C. To the solution is added styrene in the ratio of 10 cc. After these ingredients are well mixed they are poured into a mold of appropriate contour, which may be of glass or other material. The materials are subjected to irradiation in the mold by sunlight or artificial light at 30–40 degrees C. until the solution attains proper viscosity, e. g., the viscosity of honey or syrup.

The specimen or specimens are then introduced into the solution by appropriate technique. Subsequently the solution containing the embedded specimen is allowed to set at a temperature of about 28 degrees C. until it is hard. Hardening may be accelerated by subjecting the solution to occasional periods of irradiation. Usually it is desirable to complete the hardening within a period of 2 or 3 days. The completion of the hardening is indicated by the disappearance of the original greenish tint of the resin. The articles may be retained permanently in the molds if the latter are transparent. However, most usually when it is desirable to remove them this may be effected by heating the body to a temperature of about 80 degrees C. for about 10 minutes. Subsequently the body is cooled to zero degrees, in order to separate the resin from the mold. The mold may then be cracked off or otherwise removed and the surface of the resin smoothed and polished with fine sand paper and wool or silk.

It will be apparent that many variations in technique may be employed in the preparation of the specimens or objects. For example, resin prior to hardening may be introduced into tubular glass molds, such as test tubes, beakers or the like. It is also possible to introduce the composition while fluid into shallow dishes or trays, such as petrie dishes, which may be of transparent or opaque material. Irradiation of these dishes may be effected from above. It is also possible to employ tubes, trays, or dishes formed of artificial plastic materials, such as cellulose acetate, methyl methacrylate resin, or any other suitable plastic material within which the fluid embodying material constituting the subject matter of the present invention may be introduced.

The molds employed may be globular or have lenticular portions through which the embedded specimens may be viewed. The lenticulation of the surface of course results in magnification of the embedded body. Embedding of the specimen in the liquid medium may be effected by simply pouring or flooding the medium into the mold or receptacle, while the specimen is disposed in position. In some cases it may be desirable to effect the pouring or flooding under vacuum, in order to assist in the complete immersion or wetting of the body of the specimen by the resin, and in order to avoid the occlusion of bubbles of air about the specimen. It will be apparent that the mold may first be partially filled with the medium which is subjected to partial or complete hardening, and subsequently additional medium be poured or flowed over the top of the initial portion. By this technique the specimen is embedded at any desired point within the plastic. This technique also assists in the placing of the sample with a minimum degree of damage or derangement.

It will be apparent that prior to introduction into the embedding medium the specimen may be treated in various ways. For example, it may be treated with or impregnated by a suitable preservative such as formaldehyde, phenol, resorcinal or other germicidal or protective medium. It is possible to spray it with solutions of various resins such as cellulose acetate, or the like, thereby to provide a thin film thereupon which upon drying, will stiffen the specimen and assist in its introduction without derangement into the resinous medium. A solution of styrene and maleic anhydride may, also, be sprayed as a film upon the specimen and after the film is hardened sufficiently the specimen may be embedded.

Furthermore, it is possible to apply to the sample dyes and pigments which will impart permanency to the color of the specimen or specimens upon prolonged aging. In some instances the coloration of a specimen may be improved by introducing dye into the resinous embedding medium. The dye may be designed to reduce penetration of any actinic radiation that would act upon the specimen or to strengthen or bring out the inherent colors of the specimen.

The process is applicable to the preservation of all manner of specimens including butterflies, spiders and various bugs, beetles, worms, insects and the like, or to the mounting of flowers and various other botanical specimens, or to the mounting of specimens of animal or other tissue, such as animal organs and muscles. Likewise, articles or objects of art, relics, keepsakes, souvenirs and photographs may be similarly embedded and preserved.

The samples after mounting are permanently preserved in their original positions and may be subjected to handling and change of position at will and over long periods of time without derangement or damage. The ingredients constituting the resin are of relatively inert character and do not include reducing agents such as sulfur dioxide, or formaldehyde, and therefore relatively a high degree of permanency of color in the samples may be expected. However, it will of course be apparent that under some conditions inherent changes will occur in the specimens which will tend to change or impair the coloration thereof. The present process of course cannot entirely preclude such natural changes. However, the seclusion of the air from the specimens reduces the rates of such change to a minimum.

The forms of the invention herein described are to be considered as exemplary. Numerous modifications may be made therein without departure from the spirit of the invention or the scope of the following claims.

What I claim is:

1. As a new article of manufacture a specimen embedded in a solid transparent condensation product of maleic anhydride and styrene.

2. A process of mounting a specimen, which process comprises submerging the specimen in a fluid solution of maleic anhydride and styrene in a mold of suitable configuration, then subjecting the solution to irradiation by actinic light at a temperature of about 28 degrees C. until the solution is converted into a solid clear resinous mass containing the specimen embedded therein and conforming to the configuration of the mold.

HOWARD L. GERHART.